June 15, 1937.  D. E. LINDQUIST ET AL  2,084,207

JOINT AND METHOD OF MAKING THE SAME

Filed Oct. 14, 1935

David E. Lindquist,
John E. Gray,
Harold K. Rader,
Inventors,
Delos G. Haynes,
Attorney.

Patented June 15, 1937

2,084,207

UNITED STATES PATENT OFFICE 2,084,207

JOINT AND METHOD OF MAKING THE SAME

David E. Lindquist, John E. Gray, and Harold K. Rader, Port Huron, Mich., assignors to Mueller Brass Co., Port Huron, Mich., a corporation of Michigan Application October 14, 1935, Serial No. 44,930

5 Claims. (Cl. 29—157)

This invention relates to joints and fittings, and with regard to certain more specific features, to joints and fittings for connecting together lengths of pipe and the like.

Among the several objects of the invention may be noted the provision of a pipe or like fitting which is adapted to produce an improved locked joint between the pipe and fitting; the provision of a fitting of the class described which, in addition to providing a locked joint, is adapted for the effectuation of a securely sealed joint; the provision of a fitting of the class described which may be assembled into a joint with minimum effort and maximum speed and facility; and the provision of a fitting of the class described which is relatively simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is a side elevation of a T-fitting embodying the present invention, showing a pipe inserted and a joint made therewith;

Similar reference characters indicate corresponding parts throughout the several views of the drawing.

Figure 1:
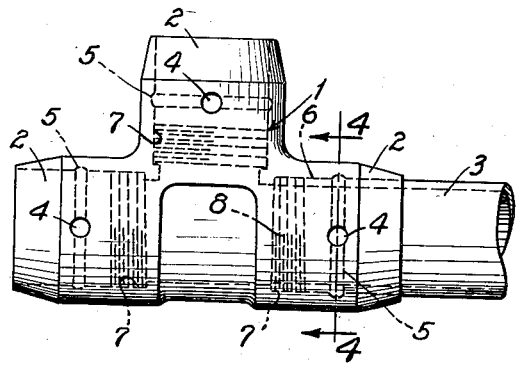

Referring now more particularly to Fig. 1, numeral 1 indicates a pipe fitting, which, for purpose of illustration, has been shown as a T. The T has been chosen for exemplary purposes only, and it is to be understood that the invention applies with equal facility to all classes of pipe fittings, as L's, couplings, crosses, nipples, adapters, caps, valve ends, and the like, the sole criterion being that the fitting must have a socket portion 2 which is adapted to telescopingly receive the length of pipe or the like which it is desired to connect thereto. The T-fitting illustrated, in accordance with its shape, has three such socket portions 2.

Basically, the fitting 1 is of the general type shown in Gresley et al. Patent Number 1,776,502, dated September 23, 1930. That is, it is a fitting designed particularly for use with relatively thin-walled pipe, which is usually made of copper. Such a pipe, for example, is indicated at numeral 3. In accordance with the teaching of the said Gresley patent, the joint effected with the fitting is made by telescoping the pipe 3 into one of the sockets 2, and thereafter introducing liquid solder or like sealing material through a sprue or feed-hole 4 into an internal groove 5 (see Fig. 2), whence it is fed by capillary attraction to the interface region between the pipe and fitting. It will be understood that the receiving portion of the socket 2 and the pipe 3 are so dimensioned that the clearance therebetween is of suitable size to induce such capillary flow of the liquid solder.

The present invention provides new means, in addition to the solder film described, whereby the pipe 3 is securely locked into the fitting 1.

Figure 2:
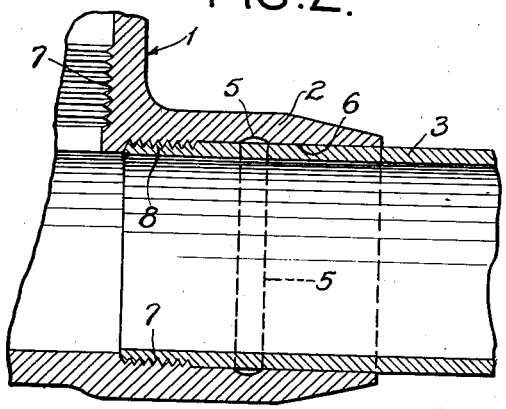
Fig. 2 is a longitudinal section of the joint of Fig. 1.

Referring now more particularly to Fig. 2, numeral 6 indicates the inner smooth, cylindrical wall of the socket portion 2. Numeral 5, as has been intimated, indicates an interior annular groove which is formed on the inner wall 6 intermediate its ends. Numeral 4, as has likewise been intimated, indicates a sprue or solder feed-hole. The smooth, cylindrical wall 6 does not, however, extend all the way to the bottom of the socket portion 2. On the contrary, the lowermost region of the socket portion 2 is provided with a slightly tapered female threaded portion 7. The threads of the portion 7 are not of as large a size as would customarily be used with a fitting of the size in question; that is, they are not large enough to constitute an absolute, secure holding means for all conditions of use, in themselves. Further, they are usually cut with sharp edges, in contradistinction to the more customary rounded edged threads used in pipe fittings where the threads alone are relied upon to secure the joint.

Figure 3:
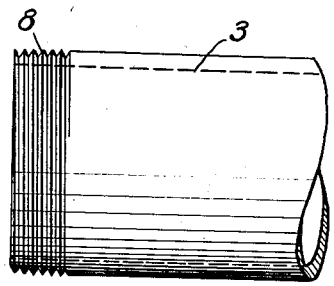
Fig. 3 is a side elevation of a pipe.

As indicated in Fig. 3, the pipe 3 is provided at its entering end with a straight male threaded portion 8. The threads of portion 8 are arranged to fit tightly into the threaded portion 7 of the socket 2. However, it is desirable that the total number of threads placed in advance on the pipe 3 be less than the corresponding number of threads in the portion 7 of the socket 2. Then, when pipe 3 is screwed home in the socket 2 in making a joint, an additional thread is cut into the pipe by the threads of the fitting. This arrangement assures that the threaded joint will be tight and unusually leak-proof.

The hereinbefore-mentioned small size of the threads is particularly emphasized by reference to Fig. 3, where it will be seen that the size of threads placed on the pipe 3 is distinctly less than would be considered useful by those versed in the art if it were desired that the threaded connection alone be the means of securing the joint.

By reason of the tapered threads in the fitting receiving the straight threads on the pipe, the binding effect upon screwing the pipe into the fitting is considerably enhanced, and a much tighter joint is thus obtained.

With the pipe 3 thus screwed tightly into the fitting 1, the joint is in condition for soldering. For this purpose, liquid solder 9 is fed in through the sprue 4 whence it spreads around the pipe through groove 5 and distributes itself by capillary attraction into the interfacial region between the pipe and fitting. However, due to the tight joint brought about at the region of the innermost thread on pipe 3, very little, if any, solder spreads beyond the smooth-walled portion 6 into the threaded portion 7. The threaded portion 7 thus, in addition to serving as a locking means for the joint, also serves as a dam preventing the spread of liquid solder into the interior of the fitting where, particularly in small-size pipe installations, it might constitute a serious obstruction to the passage of fluid.

Figure 4:
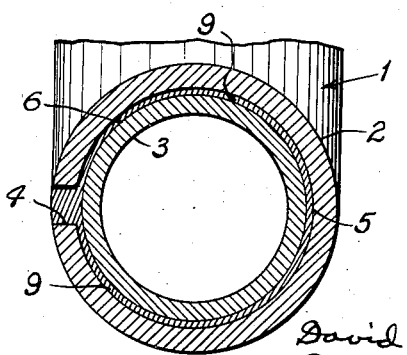
Fig. 4 is a cross section taken substantially along line 4—4 of Fig. 1.

In Fig. 4, the solidified sealing material is indicated by numeral 9.

A combination locked and sealed joint, such as that just described, is particularly useful, for example, in fire sprinkler installations where it is essential that the installation remain in position even though the temperature becomes sufficiently high to melt out the solder. With a joint as thus described, even if the solder or sealing material melts and runs out of the joint, a locked joint which is relatively tightly sealed is still maintained, and the pipe does not come out of the fitting. In many other circumstances, such a type of joint is desirable.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. The method of making a joint which comprises providing a fitting having a socket member having a smooth internal face bottomed by a female threaded portion, telescopingly inserting an entering member into said socket, said entering member having the end thereof provided with a male threaded portion, threading said male and female portions together, and introducing a melted sealing material into the interfacial region between the smooth face of the socket member and the entering member, said threading being accomplished in such a manner that the female threading in the fitting cuts at least one male thread on the entering member.

2. The method of making a joint which comprises providing a fitting having a socket member having a smooth internal face, and a female threaded portion bottoming said socket member, telescopingly inserting an entering member into said socket, said entering member having a male threaded end portion adapted to engage said female portion, threading said male and female threaded portions together in such manner that said female portion cuts at least one thread on the male portion, and introducing melted sealing material in such manner that it spreads throughout the interfacial region between said fitting and said entering member and there solidifies to seal the joint.

3. The method of making a joint which comprises providing a fitting having a socket member having a smooth internal face bottomed by a tapered female threaded portion, telescopingly inserting an entering member into said socket, said entering member having the end thereof provided with a male threaded portion, threading said male and female portions together, and, through the taper of said female threaded portion, centering said male portion in said female portion thereby to provide a substantially uniformly dimensioned interfacial region between the smooth face of the socket member and the entering member, and introducing a melted sealing material into said interfacial region and spreading said sealing material throughout said interfacial region by capillary action, and thereafter permitting the joint to cool whereby the sealing material solidifies in said interfacial region to seal the joint.

4. A joint comprising a fitting having a socket member having a smooth internal face bottomed by a tapered female threaded portion, an entering member telescopingly received in said socket, said entering member having the end thereof provided with a male threaded portion threadably engaging said female threaded portion, the taper of said female threaded portion centering the male portion in said female portion in such manner that a substantially uniformly dimensioned interfacial region is provided between the smooth face of the socket member and the said entering member, and a solidified sealing material substantially filling the said interfacial region and sealing the joint.

5. A joint comprising a fitting having a socket member having a smooth internal face bottomed by a tapered female threaded portion, an entering member telescopingly received in said socket, said entering member having the end thereof provided with a male threaded portion threadably engaging said female threaded portion, the taper of said female threaded portion centering the male portion in said female portion in such manner that a substantially uniformly dimensioned interfacial region is provided between the smooth face of the socket member and the said entering member, and a solidified sealing material substantially filling the said interfacial region and sealing the joint, the threads on both the female portion and the male portion having sharp edges comparable to those of machine screws.

DAVID E. LINDQUIST.
JOHN E. GRAY.
HAROLD K. RADER.